United States Patent [19]

Tanahashi

[11] 4,106,467
[45] Aug. 15, 1978

[54] INTERNAL COMBUSTION ENGINE WITH A SUBSIDIARY COMBUSTION CHAMBER

[75] Inventor: Toshio Tanahashi, Toyota, Japan

[73] Assignee: Toyota Jidosha Kogyo Kabushiki Kaisha, Toyota, Japan

[21] Appl. No.: 687,760

[22] Filed: May 19, 1976

[30] Foreign Application Priority Data

Sep. 30, 1975 [JP] Japan .................... 50-117186

[51] Int. Cl.² .................................... F02B 19/16
[52] U.S. Cl. .................... 123/191 SP; 123/191 S; 123/32 K; 123/32 ST; 123/32 SP
[58] Field of Search ............... 123/30 C, 30 D, 32 R, 123/32 C, 32 D, 148 A, 169 R, 169 PA, 169 PH, 191 R, 191 S, 191 SP, 193 R, 193 CH, 193 H, 193 P, 32 SP, 32 ST; 29/156.4 WL, 156.4 R, 156.7 R, 401 D, 525

[56] References Cited

U.S. PATENT DOCUMENTS

| 1,352,945 | 9/1920 | Fay | 123/191 S |
|---|---|---|---|
| 2,316,269 | 4/1943 | Maruhn | 123/33 D |
| 2,395,712 | 2/1946 | Bachle | 123/193 H |
| 2,402,889 | 6/1946 | Herreshoff | 29/156.4 R |
| 2,914,042 | 11/1959 | Rieseler | 123/32 D |
| 3,926,158 | 12/1975 | Dolza, Sr. | 123/32 ST |
| 3,968,782 | 7/1976 | Noguchi | 123/191 SP |
| 3,980,057 | 9/1976 | Sanda | 123/32 SP |
| 4,029,062 | 6/1977 | Noguchi | 123/32 ST |

FOREIGN PATENT DOCUMENTS

| 1,176,008 | 6/1957 | France | 123/32 D |
|---|---|---|---|
| 1,045,162 | 11/1958 | Fed. Rep. of Germany | 123/32 D |

*Primary Examiner*—Charles J. Myhre
*Assistant Examiner*—Jeffrey L. Yates
*Attorney, Agent, or Firm*—Stevens, Davis, Miller & Mosher

[57] ABSTRACT

An internal combustion engine comprising main and subsidiary combustion chambers interconnected by a connecting passage. A subsidiary chamber component providing therein the subsidiary combustion chamber is press-fitted into a recess formed in the cylinder head. The cylinder head and the component have a hole extending through their walls. A sleeve is fitted into the hole so as to prevent dislodging of the sleeve from the recess. A spark plug is inserted into the sleeve.

4 Claims, 2 Drawing Figures

INTERNAL COMBUSTION ENGINE WITH A SUBSIDIARY COMBUSTION CHAMBER

DESCRIPTION OF THE INVENTION

The present invention relates to an improvement of an internal combustion engine comprising a main combustion chamber and a subsidiary combustion chamber, in which use of a lean air-fuel mixture is made possible.

As a conventional method for reducing simultaneously the level of poisonous components contained in exhaust gases from internal combustion engines (hereinafter referred to as engines), such as CO (carbon monoxide), HC (unburned hydrocarbons) and $NO_x$ (nitrogen oxides), there is known a method in which a lean air-fuel mixture having an increased air-fuel ratio (i.e. beyond the stoichiometric ratio) is fed to an engine and burned. This lean air-fuel mixture, however, is less easily ignited and even when it is ignited, the flame speed is very low, and therefore there occur such disadvantages as reduction of the specific fuel consumption (g/ps.hr) and extreme lowering of the working efficiency.

In order to eliminate the above disadvantages, an engine has been proposed which is provided with a main combustion chamber and a subsidiary combustion chamber. In this engine the combustion chamber comprises the main combustion chamber and the subsidiary combustion chamber which are interconnected to each via a passage. At first, a fuel mixture in the subsidiary combustion chamber is ignited, and then the increase in the pressure of the combustion gas in the subsidiary combustion chamber causes that combustion gas to be injected into the main combustion chamber at a high speed so as to spread throughout the main combustion chamber, thereby causing rapid combustion of the fuel mixture in the main combustion chamber, increasing the combustion velocity of the fuel mixture in the main combustion chamber, and preventing the reduction of the working efficiency of the engine.

Engines with subsidiary combustion chambers of the type can be roughly divided into two separate types, one of the types being a stratified combustion type, the other type being a uniform lean-fuel mixture combustion type. The stratified combustion engine uses a combustion method such that a rich-fuel mixture, which is easily ignited, is introduced into the subsidiary combustion chamber via a subsidiary intake valve and is ignited. The stratified combustion engine has been already put into practical use by some engine manufacturers. In the engine with a subsidiary combustion chamber of this type, a fuel mixture is easily ignited, and even if an extremely lean-fuel mixture is fed into the main combustion chamber, the engine can be operated. However, in this engine it is necessary to supply two separate fuel mixtures, i.e., a lean fuel mixture and a rich fuel mixture. Consequently, the fuel system and the valve mechanism of the engine are complicated and production of the engine becomes difficult, resulting in increase of the manufacturing cost. Furthermore there are disadvantages that control and adjustment of the fuel system are difficult and maintenance and complete equipment of the engine require a great deal of labor.

In contrast to this engine, in the engine of uniform lean fuel mixture combustion type, there is no provision of a fuel mixture introducing means, such as a subsidiary intake valve, in the subsidiary combustion chamber. This engine uses a combustion method such that a lean fuel mixture in the main combustion chamber is forced into the subsidiary combustion chamber via a connecting passage connecting the main combustion chamber with the subsidiary combustion chamber, and then the lean fuel mixture in the subsidiary combustion chamber is ignited. The engine of this type is of an extremely simple construction and thus production and maintenance of the engine are simplified. Furthermore, the engine has high reliability. However, a lean fuel mixture per se is less easily ignited, and particularly in the engine of this type, at the intake stroke, complete scavenging of the residual gas in the subsidiary combustion chamber cannot be attained, and because of the presence of this residual gas the ease of ignition of the lean fuel mixture fed in the subsidiary combustion chamber is extremely low. Therefore, it is very difficult to put engines of this type into practical use. However, as an engine capable of eliminating the above mentioned drawbacks, there has been proposed by us an engine in which the spark gap of the ignition plug is located in the connecting passage which connects the main combustion chamber with the subsidiary combustion chamber. In this engine, when a lean fuel mixture is ignited at the time immediately before completion of the compression stroke, residual gas created in the preceeding cycle and left in the connecting passage, has already carried away into the subsidiary combustion chamber by virtue of the lean fuel mixture flowing in the connecting passage at the time of the compression stroke, thus avoiding the difficulty of ignition of a lean fuel mixture owing to the existance of the residual gas. Consequently, in our proposed engine, a lean fuel mixture can be easily ignited only by using an ignition system having a high performance.

In the above engine equipped with a subsidiary combustion chamber, combustion is first conducted in the subsidiary combustion chamber, and therefore the temperature of the subsidiary chamber, especially in the vicinity of the connecting passage, is readily elevated. Especially in the case of an engine of the uniform lean fuel mixture combustion type, since there is no cooling effect of a rich mixture, the temperature elevation in the subsidiary combustion chamber can be extreme. Consequently, it is necessary to construct the subsidiary combustion chamber by using an expensive heat-resistant material, for example, stainless steel. However, in view of the manufacturing cost and mechanical processing to be applied to a cylinder head, it is not practical to construct the entire cylinder head of the engine by using stainless steel. Consequently, the subsidiary combustion chamber should be made of a material different from the material of the cylinder head.

As one solution of this problem, we constructed the subsidiary combustion chamber from a material different from the material of the cylinder head, for example, in stainless steel. Since the temperature of this subsidiary chamber component is considerably elevated, it is necessary to dissipate this heat effectively from the subsidiary chamber component to the cylinder head. Consequently, in this engine it has been made possible to prevent overheating of the subsidiary chamber component by press-fitting the subsidiary chamber component into a recess formed in the cylinder head by a method which minimizes the thermal resistivity. Thus, problems such as pre-ignition which would occur owing to the overheating of the subsidiary chamber component are prevented. FIG. 1 shows this engine. In FIG. 1, reference numeral 1 designates a cylinder block, reference numeral 2 designates a cylinder formed in the cylinder block, reference numeral 3 designates a piston reciprocally movable in the cylinder, and reference numeral 4 designates a cylinder head fixed on the cylinder head 1 and made of an aluminum alloy having a thermal expansion coefficient of about $24 \times 10^{-6}/°$ C. A main combustion chamber 6 is formed between the top surface of the piston 3 and the inner surface of the cylinder head 4. An intake valve 5 introducing a lean fuel mixture into the main combustion chamber 6 and an exhaust valve (not shown) are disposed in the cylinder head 4. A recess 7 is formed on the inner surface of the cylinder head 4 in the vicinity of the top of the main combustion chamber 6. A subsidiary chamber component 8 is press-fitted into the recess 7 from the main combustion chamber side and forms therein a subsidiary combustion chamber 9 and a connecting passage 10 connecting the subsidiary combustion chamber with the main combustion chamber. This subsidiary chamber component 8 is made from a stainless steel having a thermal expansion coefficient of about $13 \times 10^{-6}/°$ C. In the subsidiary chamber component 8 and the cylinder head 4, there is a hole 11 which connects the connecting passage 10 and the outside of the cylinder head, and a spark plug 12 is screwed into the hole 11. A spark gap 12a of the spark plug 12 is located in the connecting passage 10. In FIG. 1, a screw thread is formed on the inner wall of the hole 11. When the spark plug 12 is screwed into the hole 11, the screw portion of the spark plug 12 comes into engagement with the screw thread of the hole 11 on the subsidiary chamber component 8. Consequently, the ignition plug 12 serves to prevent dislodging of the subsidiary chamber component 8 from the recess 7 and also to hold the subsidiary chamber component 8 in a position. However, it sometimes happens that the subsidiary chamber component 8 moves after the spark plug 12 has been removed. In that case, the screw thread on the cylinder head 4 is not aligned with the screw thread on the subsidiary chamber component 8, and when the spark plug 12 is inserted it does not fit correctly, and the screw threads of the cylinder head 4 and the subsidiary chamber component 8 are damaged.

An object of the invention is to eliminate the above-mentioned drawbacks.

According to the present invention, an internal combustion engine with a subsidiary combustion chamber, comprises a cylinder block, a piston reciprocally movable in the cylinder block, a cylinder head mounted on the cylinder block and having an inner surface, a main combustion chamber being formed between said inner surface and the top surface of the piston, the cylinder head having therein a recess opening into the main combustion chamber, a subsidiary chamber component made of a heat resistant material and press-fitted into said recess, said component having therein an inner chamber comprising a subsidiary combustion chamber and a connecting passage which connects the main combustion chamber with the subsidiary combustion chamber, the cylinder head and the subsidiary chamber component having therein a hole extending through the walls of the cylinder head and the subsidiary chamber component from the outside of the cylinder head towards the inner chamber, and a sleeve fitted into said hole so as to prevent dislodging of the subsidiary chamber component from the recess and for receiving spark plug therein.

The above-mentioned object of the present invention may be more fully understood from the following description of a preferred embodiment of the invention, together with the accompanying drawings.

DESCRIPTION OF A PREFERRED EMBODIMENT

Figure 1:
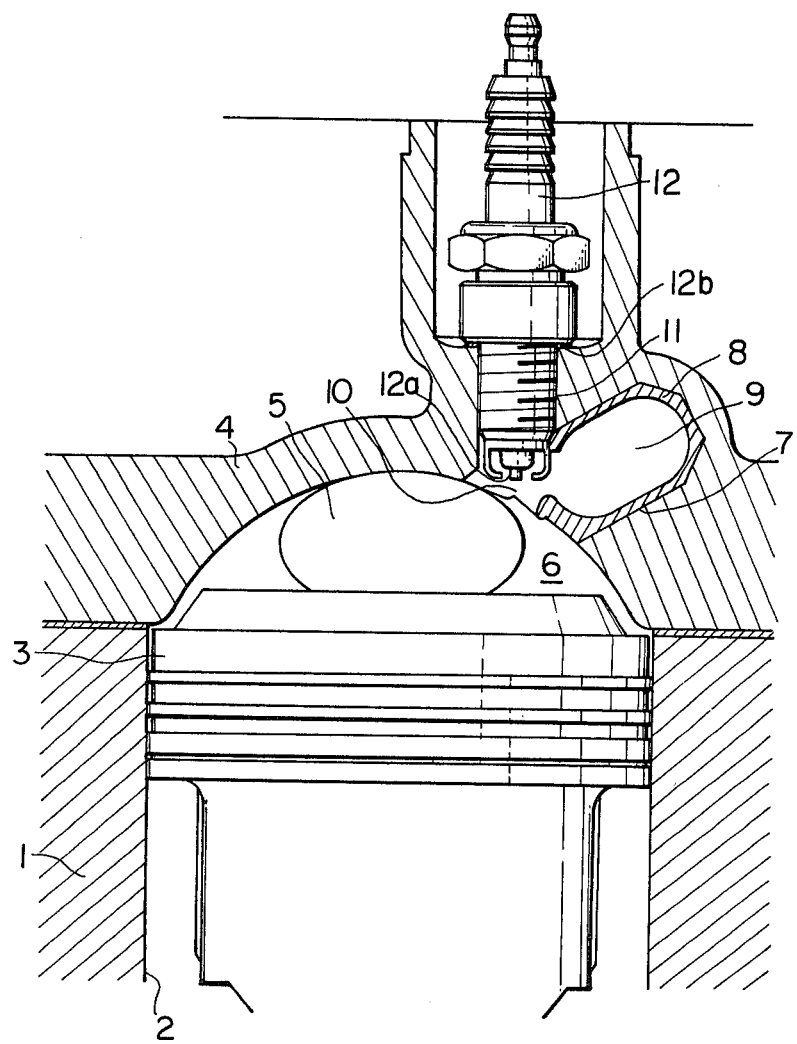
FIG. 1 is a cross-sectional view of an internal combustion engine with a subsidiary combustion chamber which does not embody the present invention.
Figure 2:
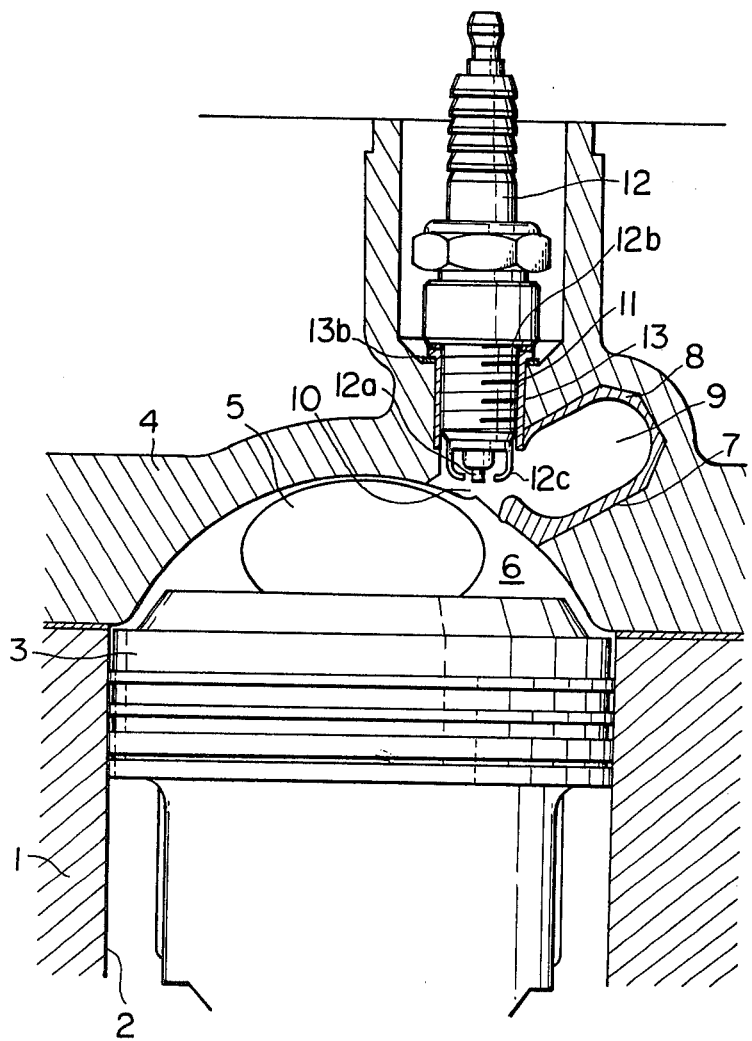
FIG. 2 is a cross-sectional view of an internal combustion engine with a subsidiary combustion chamber according to the present invention.

In FIG. 2, similar components are indicated with the same reference numerals as in FIG. 1, and description of the similar components is omitted. Referring to FIG. 2, there is provided a flanged sleeve 13 having screw threads on the inner and the outer walls thereof. The flanged sleeve 13 is screwed, under torque A, into a screw hole 11 extending through the walls of the cylinder head 4 and the subsidiary chamber component 8, with a gasket 13b interposed between the flange and the cylinder head 4. A spark plug 12 is screwed in the sleeve 13, under torque B, with a gasket 12b interposed between the flange and the spark plug 12, so that the spark gap 12a of the spark plug 12 is located in a connecting passage 10 or in the subsidiary combustion chamber 9. In this embodiment, the torque A is made higher than the torque B. Consequently, dislodging of the subsidiary chamber component 8 and its positioning are prevented by the sleeve 13, and the spark plug 12 is mounted to or removed from the cylinder head through this fixed sleeve 13. Accordingly, damage to the screw threads of the cylinder head and the subsidiary chamber component can be effectively prevented.

What is claimed is:

1. An internal combustion engine with a subsidiary combustion chamber, said engine comprising:
   a cylinder block;
   a piston reciprocally disposed in said cylinder block;
   a cylinder head on the cylinder block, said cylinder head having an inner surface;
   a main combustion chamber defined between the inner surface of the cylinder head and the top surface of the piston;
   said cylinder head having a recess therein opening into the main combustion chamber;
   a subsidiary chamber component made of heat resistant material said recess having a mouth through which all of said subsidiary chamber will pass, said component being press-fitted into said recess through said mouth, said component having an inner chamber which comprises the subsidiary combustion chamber and a connecting passage which connects the main combustion chamber with the subsidiary combustion chamber;
   a spark plug;
   a first hole defined in the cylinder head;
   a second hole defined in the subsidiary chamber component and aligned with the first hole; and
   a flanged sleeve rigidly fixed into the first and second holes so as to prevent dislodging of the subsidiary chamber component from the recess, said sleeve having a threaded hole in which the spark plug is positioned.

2. An internal combustion engine as recited in claim 1, wherein the holes are threaded, the sleeve has a screw thread on its outer wall, and the sleeve is screwed into the threaded holes.

3. An internal combustion engine as recited in claim 2, wherein the sleeve has an outwardly extending flange on its outer end so as to securely clamp the sleeve onto the cylinder head.

4. An internal combustion engine as recited in claim 1, wherein the inner end of the second hole opens into the connecting passage so that the spark gap of the spark plug is located in the connecting passage.

* * * * *